(12) United States Patent
Stevens et al.

(10) Patent No.: US 7,957,645 B1
(45) Date of Patent: Jun. 7, 2011

(54) FIBER OPTIC INTERCONNECTION

(75) Inventors: Rick C. Stevens, Apple Valley, MN (US); Brian L. Uhlhorn, St. Paul, MN (US); Roger J. Karnopp, Eagan, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 866 days.

(21) Appl. No.: 11/894,115

(22) Filed: Aug. 20, 2007

(51) Int. Cl.
*H04B 10/207* (2006.01)
*H04J 14/02* (2006.01)
(52) U.S. Cl. .............................. 398/63; 398/68; 398/71
(58) Field of Classification Search .............. 398/48–51, 398/61–64, 68–71
See application file for complete search history.

(56) References Cited

U.S. PATENT DOCUMENTS

| | | | |
|---|---|---|---|
| 4,457,581 A | 7/1984 | Johnson et al. | |
| 4,595,255 A | 6/1986 | Bhatt et al. | |
| 4,653,845 A | 3/1987 | Tremblay et al. | |
| 4,654,889 A | 3/1987 | Shutterly | |
| 5,663,818 A * | 9/1997 | Yamamoto et al. | 398/58 |
| 6,411,418 B1 | 6/2002 | Deri et al. | |
| 6,429,955 B1 * | 8/2002 | Suemura et al. | 398/48 |
| 2002/0083195 A1 * | 6/2002 | Beshai et al. | 709/238 |
| 2003/0067649 A1 * | 4/2003 | Suzuki et al. | 359/124 |
| 2006/0140642 A1 * | 6/2006 | Brolin | 398/183 |

* cited by examiner

*Primary Examiner* — Leslie Pascal
(74) *Attorney, Agent, or Firm* — Brooks, Cameron & Huebsch, PLC

(57) ABSTRACT

A number of fiber optic interconnection systems and apparatuses, optical network nodes, and methods are disclosed. One fiber optic interconnection system embodiment includes a first interconnectivity component for receiving and sending one or more signals between at least a first optical network node and a second optical network node, a second interconnectivity component for receiving and sending one or more signals between at least the first optical network node and the second optical network node, a distribution component that encodes an information signal onto a number of optical signals having different wavelength ranges, and a directional component for directing the number of optical signals having different wavelength ranges through one of the first or second interconnectivity components.

8 Claims, 3 Drawing Sheets

FIBER OPTIC INTERCONNECTION

FIELD OF THE DISCLOSURE

The present disclosure relates to optical communication. In particular, the present disclosure relates to fiber optic interconnections.

BACKGROUND

In the field of optical communication, information is typically encoded onto a light beam through use of a modulator in order to create an optical signal that is encoded with information that can be transferred from one device to another via an interconnection device. As the need to increase the amount of information transmitted increases, the solutions that may be applicable for some environments, may not be applicable to all environments.

For example, in situations where a communications system or apparatus is exposed to harsh environmental conditions such as extreme high or low temperatures, extreme changes in temperature, exposure to high radiation levels, large amounts of shock forces or unstable environments, etc, the solutions for higher speed communication may create issues with component accuracy or reliability, among other issues.

For instance, one solution to increase the speed of information transmission is typically accomplished by using a single light source and receiver and increasing the bandwidth to the data rate needed. However, components such as a serialize/de-serialize (SERDES) device that are reliable in such environments are typically too slow to be useful for such applications.

Another technique is to use wavelength division multiplexing in a technique often referred to as dense wavelength division multiplexing (DWDM). However, DWDM components may have accuracy and operational issues in some high/low/changing temperature, and unstable environments, among other environmental issues. In such instances, the wavelength accuracy and/or interference between components may cause the network to have incorrect instructions or receive incorrect information, or to malfunction.

For example, due to their power consumption needs, since some DWDM components generate more heat than non-DWDM components, many DWDM components maintain their temperature through use of thermo-electric coolers (TECs). However, these components may not be suitable for environments such as a space environment, for example, where low power, high reliability, and the ability to survive shock and vibration (e.g., at launch) may be issues. Additionally, as data density is increased, the effects of radiation on the transmission of the information may increase the amount of errors in the information.

Further, optical fibers often have an amount of available bandwidth that is large enough to carry all of the information that is to be transferred, however, as the amount of information to be transferred increases, the speed of any interconnection devices between two nodes of a network that are transferring data also has to be increased to handle the increased bandwidth. As discussed above, in some environmental conditions, the increase in bandwidth and/or in the speed of the interconnection device can create reliability and/or accuracy issues with these devices.

SUMMARY

The present disclosure includes a number of fiber optic interconnection systems and apparatuses, optical network nodes, and method embodiments. Such embodiments can be utilized, for example, in aircraft, watercraft, spacecraft, and landcraft. Through use of multiple interconnect nodes; the transmission of information can be more reliable and accurate in many instances.

As stated above, the present disclosure includes a number of system embodiments. For example, in some embodiments, the system can include a number of interconnectivity components.

For instance, a first interconnectivity component can be utilized for receiving and sending one or more signals between at least a first optical network node and a second optical network node. Such systems also include at least a second interconnectivity component for receiving and sending one or more signals between at least the first optical network node and the second optical network node.

In various embodiments, the system can include a distribution component that encodes an information signal onto a number of optical signals having different wavelength ranges. Some embodiments can include a directional component for directing the number of optical signals having different wavelength ranges through one of the first or second interconnectivity components.

System embodiments can include a combination component that combines the optical signals that have been directed through the first and second interconnectivity components into a combined information signal. This component can be useful in re-assembling an information signal that has been broken into pieces for sending through the multiple interconnectivity components.

The interconnection can be of any suitable type. For example, star or ring type interconnections can be utilized in various embodiments. The interconnectivity component can also be a coupler, such as a star or ring type coupler in some embodiments.

In various embodiments, the distribution component can include a number of light sources. In some embodiments, the light source may be independent of the distribution component. Also, in some embodiments, the number of light sources can be more than one and the multiple light sources can be used for generating different wavelength optical signals. This can also be accomplished with one, some, or all of the multiple light sources independent of the distribution component.

In some embodiments, the distribution component can include a beam splitter for splitting a light beam into different wavelength ranges for encoding with information from the information signal onto to the split light beams to create the number of optical signals. In various embodiments, the distribution component can have multiple beam splitters for splitting multiple light beams, such as in embodiments with multiple light sources. Similarly to as discussed above, one, some, or all of the beam splitters may be independent of the distribution component, in such embodiments.

In some embodiments, the distribution component can include a modulator for encoding the information from the information signal onto to the split light beams to create the number of optical signals. In various embodiments, the distribution component can have multiple modulators for encoding the information, such as in embodiments with multiple light sources. Similarly to as discussed above, one, some, or all of the modulators may be independent of the distribution component, in such embodiments.

As discussed above, the present disclosure also includes a number of fiber optic interconnection apparatus embodiments. For example, in some embodiments, the interconnection apparatus includes a first interconnectivity component for receiving and sending one or more signals between at least a first optical network node and a second optical network node. The apparatus embodiment also includes a second interconnectivity component for receiving and sending one or more signals between at least the first optical network node and the second optical network node. In such embodiments, the first and second interconnectivity components each receive an optical information signal encoded by a distribution component.

The present disclosure also includes a number of optical network node embodiments. In some embodiments, the optical network node includes a distribution component that distributes a number of light beam segments where each segment includes a different wavelength range and where each segment is encoded with information from an information signal. The optical network node embodiment can also include a directional component for directing the number of optical signals having different wavelength ranges through one of a number of interconnectivity components, in various embodiments.

In some embodiments, the optical network node can include a combination component that combines the optical signals that have been directed through the first and second interconnectivity components into a combined information signal. Combination components can also be independent of the optical network node in some embodiments.

In various embodiments, the optical network node includes multiple combination components that combine the optical signals that have been directed through the first and second interconnectivity components into a combined information signal. Such arrangements can allow for an optical communication system to have more information passed therethrough, in some embodiments, among other benefits.

In some embodiments, the optical network node includes multiple receiver components for receiving optical signals from multiple optical interconnect nodes and where each receiver component receives a number of specific optical signals in a number of particular wavelength ranges and directs each specific optical signal to one of the combination components for combination with other specific optical signals directed from other receiver components. Such arrangements can also allow for an optical communication system to have more information passed therethrough, in some embodiments, among other benefits.

The present disclosure also includes a number of method embodiments. For example, in some embodiments a method can include distributing a number of light beam segments where each segment includes a different wavelength range and where each segment is encoded with information from an information signal to form an optical signal.

The method can also include receiving and sending with at least two optical interconnect nodes one or more signals between at least a first optical network node and a second optical network node. In some embodiments a method can include combining the optical signals that have been directed through the first and second interconnectivity components into a combined information signal.

DETAILED DESCRIPTION

Figure 1:
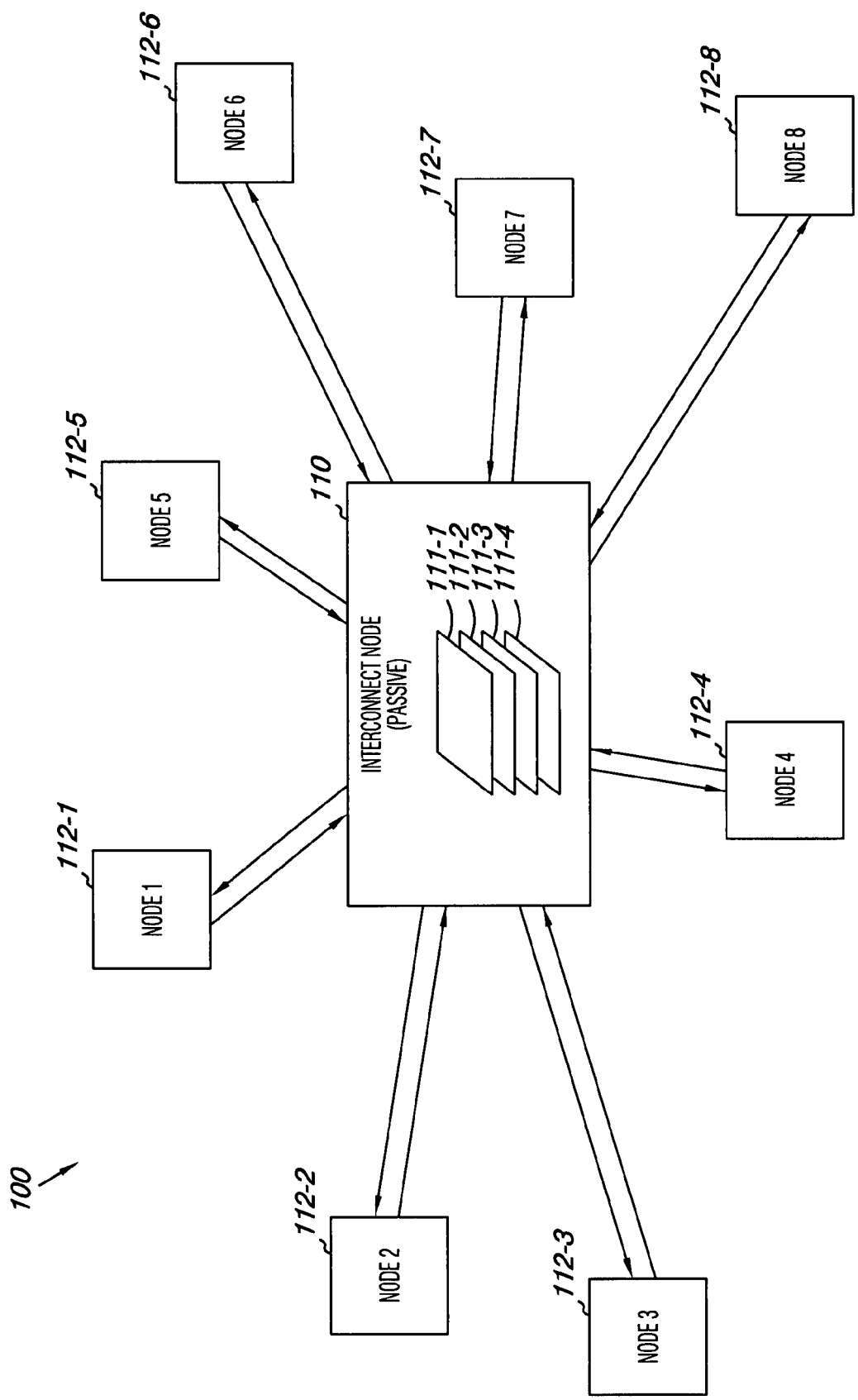
FIG. 1 is an illustration of an optical interconnection system according to an embodiment of the present disclosure.

The present disclosure includes a number of method and system embodiments. Embodiments of the present disclosure will now be described in relation to the accompanying drawings, which will at least assist in illustrating various features of the various embodiments.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2.

As will be appreciated, elements shown in the various embodiments herein can be added, exchanged, and/or eliminated so as to provide a number of additional embodiments. In addition, discussion of features and/or attributes for an element with respect to one figure can also apply to the element shown in one or more additional figures.

FIG. 1 is an illustration of an optical interconnect system according to an embodiment of the present disclosure. As discussed above, any suitable type of interconnection can be utilized. A few such interconnection types are discussed below to allow the reader to become more familiar with the concepts of the types before the discussion of the embodiment of FIG. 1.

Generally, networks allow information to be sent to, shared with, passed on, or bypassed within a number of nodes (e.g., computing devices or other network devices). This can be facilitated through use of a server (e.g., a main computing device that can direct traffic on the network).

Network types, for example, include local area networks (LANs), metropolitan area networks (MANs), and wide area networks (WANs), among other network types. Networks can also be designed to provide intra-vehicle/building or inter-vehicle/building communications, broadcast distribution, intelligent transportation systems (ITS), telecommunications, supervisory control and data acquisition (SCADA) networks, and other types of communications between two devices.

In addition to the different types of networks, networks can be configured in a number of interconnection types. These include bus interconnections, with or without a backbone, star interconnections, ring interconnections, which can be redundant and/or self-healing, other types of interconnections, or some combination of these.

Generally, a bus interconnection, (e.g., daisy-chain) has each node connected on a main transmission line. At one end is a controller and at the other end is a terminator. Any node that wants to talk to the server has to wait its turn for access to the transmission line. In such networks, only one node can communicate at a time. When a node uses the network, the information is sent to the controller, which then sends the information down the line of nodes until it reaches the terminating node. In such networks each computer in the line receives the same information.

A bus network with a backbone operates in the same fashion, but each node has an individual connection to the network. A bus with a backbone interconnection offers greater reliability than a bus type interconnection. In a bus interconnection, if one node in the network goes down, the network is broken. A backbone adds reliability in that the loss of one node may not disrupt the entire network.

Star networks incorporate multi-port star interconnects which utilize a main controlling node to interconnect with all the other nodes in the network. As with the bus with a backbone interconnection, the failure of one node may not cause a failure in the network. One type of star interconnection is called a passive fiber-optic star interconnection and distributes all incoming light, on the input ports, to all output ports. In some embodiments, a star coupler can be utilized where information from one or more inputs can be coupled (i.e., combined). This type of interconnect will be discussed in more detail with respect to FIGS. 1 and 2.

Ring interconnections operate like bus interconnections with the exception of a terminating node. Ring interconnections utilize nodes in a ring link to a main communication cable. In some embodiments, a ring coupler can be utilized where information from one or more inputs can be coupled (i.e., combined).

Ring interconnections typically utilize tokens containing information requested by one or more node on the network. The token passes around the ring until the requesting node(s) have received the data.

Token can be designed to use a packet of information that serves as an address for the node that requested the information. The node then "empties" the token, which continues to travel the ring until another node requests information to be put into the token.

One type of ring interconnection uses two communication cables sending information in both directions. Such an interconnection is sometimes referred to as a counter-rotating ring, this creates a fault tolerant network that can redirect transmission in the other direction, should a node on the network detect a disruption. Such an interconnection type can use a fiber optic transceiver, one controlling unit in set in "master" mode along with several nodes that have been set as "remote" units.

In such interconnection arrangements, the first remote data transceiver receives the transmission from the master unit and re-transmits it to the next remote unit as well as transmitting it back to the master unit. An interruption in the signal line on the first ring can be bypassed via the second ring, allowing the network to maintain integrity.

As readers will understand, there are other interconnection types that can be utilized for network communication. The reader should understand that the present disclosure can be utilized with the types described above and other types not discussed herein for sake of brevity.

As stated above, FIG. 1 is an illustration of an optical interconnect system according to an embodiment of the present disclosure. In the embodiment illustrated in FIG. 1, the optical interconnect system 100 includes a number of optical network nodes 112-1, 112-2, 112-3, 112-4, 112-5, 112-6, 112-7, and 112-8.

In some embodiments, an optical interconnect system can have more or less optical network nodes. The embodiment also includes an interconnect apparatus (e.g., interconnection node 110) which can be passive in some embodiments.

The interconnect node 110 includes multiple interconnectivity components 111-1, 111-2, 111-3, and 111-4. In some embodiments, an optical interconnect system can have more or less interconnectivity components and/or nodes.

The interconnectivity components 111-1 through 111-4 receive pieces of information from the nodes. These pieces of information are parts of an optical signal that has been segmented.

The segmentation allows more information to be transferred since several interconnectivity components are passing the information on. In the embodiment illustrated, information from one optical network node (e.g., node 1) can be passed to one or more other optical network nodes (e.g., node 3).

In the embodiment of FIG. 1, the network illustrated is a passive star interconnect network. A passive fiber optic star interconnect network distributes all incoming light (i.e., optical signals), on the input ports, to all output ports (e.g., outputs to all of the optical network nodes).

A network with the logical function of a bus can also be obtained by such a network interconnect type by connecting the transmitting and receiving side of each node to one input and output fiber of the interconnect node, respectively. By using wavelength division multiplexing (WDM), multiple wavelength (e.g., color of light) channels can be used to carry information simultaneously through the network 100.

In some embodiments, each optical network node can transmit on a particular wavelength, or within a wavelength range, that is unique to the optical network node. In some embodiments, a number of receivers each within, or associated with, an optical network node can listen to one or more wavelengths to receive information on the various wavelengths.

Figure 2:
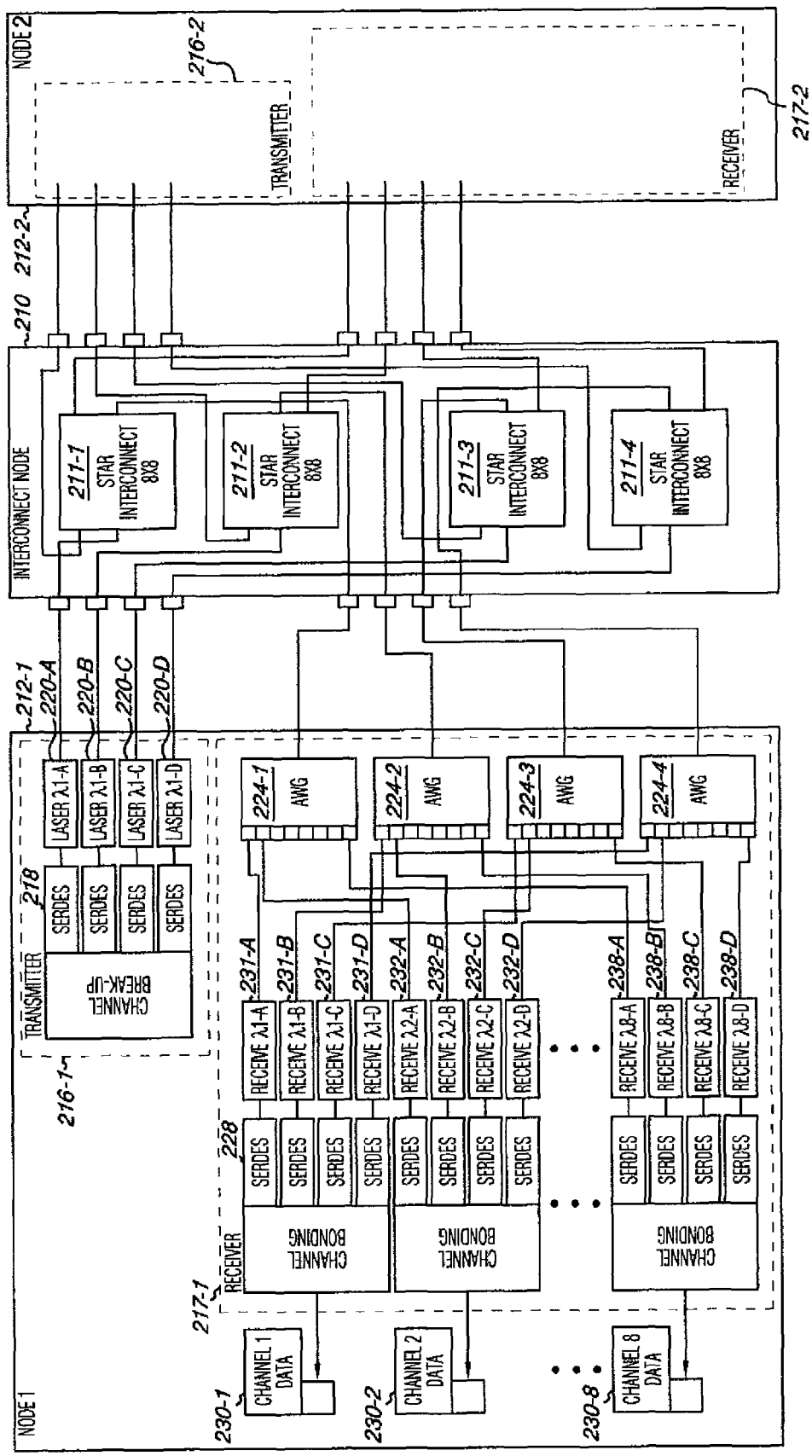
FIG. 2 is an illustration of an interconnection between an interconnectivity component, first node, and a second node of the system according to an embodiment of the present disclosure.

FIG. 2 is an illustration of an interconnection between an interconnect apparatus and two nodes of the system according to an embodiment of the present disclosure. In the embodiment of FIG. 2, the illustration shows optical network node 212-1 (e.g., optical network node 112-1 of FIG. 1), optical network node 212-2 (e.g., optical network node 112-2 of FIG. 1), and the interconnect node 210 (e.g., interconnect node 110 of FIG. 1).

In the embodiment illustrated in FIG. 2, the optical network nodes 212-1 and 212-2 include a transmitter 216-1, 216-2. In such embodiments, the transmitter can provide functionality as a distribution component for segmenting the information, light beam, and/or optical signal into wavelengths or wavelength ranges. In some embodiments, the distribution functionality can be provided independent from the transmitter.

In some embodiments, the transmitter can also provide functionality as a directional component for directing a number of optical signals having different wavelengths or wavelength ranges through the interconnect node 210. In various embodiments, the directional functionality can be provided independent from the transmitter. The directional functionality can, for example be provided by a light source generating a light beam directed into an optical fiber, among other such components that can direct an optical signal.

In the illustrated embodiment of FIG. 2, the transmitter includes a channel break-up component that breaks the information to be encoded onto a light beam into segments to be encoded onto a number of split light beams segments (e.g., each having a different wavelength range). In the embodiment of FIG. 2, rather than splitting a single light beam with a beam splitter, the embodiment includes multiple light sources 220-A, 220-B, 220-C, and 220-D.

Accordingly, in the embodiment illustrated in FIG. 2, four light beams are generated. In such embodiments, the wavelength range can be a single wavelength or can be a range including more than one wavelength.

The embodiment also includes a number of SERDES 218 for serializing the information to be encoded onto the number of split light beam segments. In this way, the information can be segmented into parts for encoding on the light beams (e.g., light beam segments). Since, in such embodiments, multiple light beam segments are being used, multiple SERDES can also be used.

This can be beneficial for a variety of reasons including the ability to utilize multiple slow throughput SERDES that are more reliable and/or more accurate in some environmental conditions, and can often be less expensive. In some instances, the throughput can be the same as a higher throughput SERDES since, for example, in the embodiment of FIG. 2, the transmitter can transmit four parallel optical signals at the same time thereby sending four times the information of a single optical signal. Such a system could, therefore, be equal to a SERDES having four times the throughput as one of the SERDES being utilized in the present disclosure without the issues involved with using the higher throughput SERDES, in some instances.

As discussed above, in some embodiments, the light beam may be generated by a single light source and can be split into a number of light beam segments (e.g., of different wavelength ranges). This can be accomplished by a beam splitter, for example. In such embodiments, the one or more light sources and/or one or more beam splitters can be independent of the transmitter.

Further, encoding the information to be transmitted onto the light beams can be accomplished in any suitable manner. For example, one or more modulators, such as Electro-Absorption Modulators (EAMs) and/or Mach-Zehnder Modulators (MZMs) can be utilized, in various embodiments. In some embodiments, such as that illustrated in FIG. 2, the one or more lasers themselves can be modulated (i.e., direct modulation) to encode the information onto the light beams in order to form the optical signals to be transmitted.

Once the information is encoded on the light beam segments thereby forming optical signals, the optical signals are then directed toward the interconnect node 210. As illustrated in the embodiment of FIG. 2, each of the optical signals can be directed to a different interconnectivity component 211-1 through 211-4. As discussed above, in various embodiments there can be more or less interconnect nodes and/or interconnectivity components than those illustrated in the embodiment of FIG. 2.

It should be noted, as is discussed above, that in various embodiments, more or less of the components described with respect to the transmitter can be utilized and that one or more of such components can be provided independent of the transmitter and/or an optical network node (e.g., may be in another network device or may be independent components).

Each of the interconnectivity components 211-1 through 211-4 then directs the optical signal to one or more optical network nodes (e.g., 112-1 through 112-8 of FIG. 1). In such an embodiment, the information can therefore be divided and the divided segments can be transferred substantially in parallel, thereby increasing the throughput of the network.

Although the information transmitted from optical network node 212-1 would likely be transmitted to and received by a different optical network node, for sake of convenience, optical network node 212-1 will be used to illustrate how information would be received by one of the other optical network nodes (e.g., in this embodiment, the receiving optical network node would be designed in the same manner as optical network node 212-1). In some embodiments, the design of one or more of the optical network nodes may be different than that illustrated in the embodiment of FIG. 2.

As illustrated in the embodiment of FIG. 2, the optical network nodes 212-1, 212-2 include a receiver 217-1, 217-2 having a number of arrayed waveguide gratings (AWG) 224-1 through 224-4. In various embodiments, other mechanisms can be used to receive and/or distribute the optical signals to their various destinations within the receiver. For example, suitable mechanisms can include one or more AWGs, as discussed above, film filters (e.g., thin films), Bragg filters, and other suitable mechanisms for separating optical signals. In the embodiment of FIG. 2, the receiver 217 provides functionality to receive the optical signals from the interconnectivity components 211-1 through 211-4 and to combine the optical signals that have been directed through the interconnectivity components into a combined information signal.

The arrayed waveguide gratings 224-1 through 224-4 can be utilized to direct a particular wavelength from a particular source to a particular destination. In the embodiment illustrated in FIG. 2, the receiver is receiving optical signals from eight optical network nodes (e.g., nodes 112-1 through 112-8 of FIG. 1).

In the illustrated embodiment of FIG. 2, the AWGs are directing all optical signals from optical network node 212-1 to be bonded together (e.g., 231-A, 231-B, 231-C, and 231-D). The embodiment of FIG. 2 also illustrates that the optical signals from the other optical network nodes are also grouped together to be bonded (i.e., 232-A, 232-B, 232-C, 232-D are all grouped and 238-A, 238-B, 238-C, and 238-D are grouped, the optical signals from nodes 3-7 have been left out of the illustration in FIG. 2 for sake of clarity and brevity, but it is to be understood that they could also be grouped). The optical signals 231-A through 231-D correspond to light beams generated and encoded from light sources 220-A through 220-D in transmitter 216.

In the embodiment of FIG. 2, multiple SERDES 228 are also provided in the receiver 217. Once received and grouped, multiple SERDES 228 can be utilized to de-serialize the optical signals. In some embodiments, more or less SERDES can be used. In this way, the information that has been segmented can be positioned in order for bonding (i.e., combination).

In the illustrated embodiment of FIG. 2, the receiver includes a number of channel bonding components that bond the information that was encoded into an information signal that can be passed through the various channels 230-1, 230-2, . . . and 230-8). The information signal can be electronic or optical in various embodiments.

Figure 3:
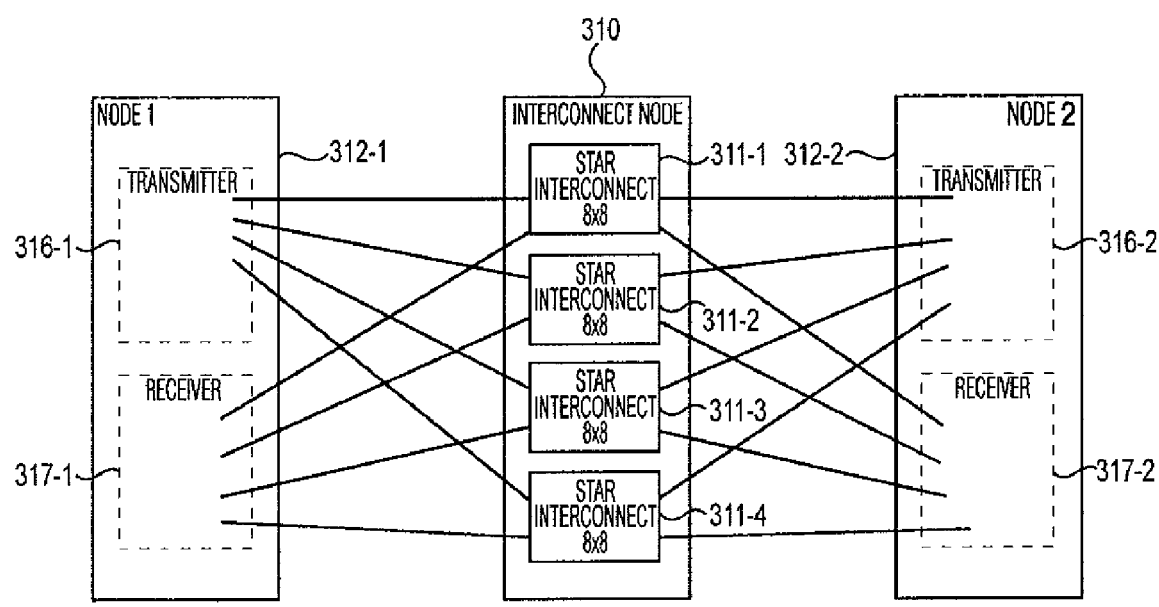
FIG. 3 is an illustration of an interconnection between a first node, a second node, and an interconnectivity component according to an embodiment of the present disclosure.

FIG. 3 is an illustration of an interconnection between the first node 312-1, the second node 312-2, and the interconnect node 310 according to an embodiment of the present disclosure, as discussed herein.

It should be noted that in various embodiments, more or less AWGs, SERDES, channel bonding components, and/or channels can be utilized and that one or more of such components can be provided independent of the receiver and/or an optical network node (e.g., may be in another network device or may be independent components). Further, although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the present disclosure.

It is to be understood that the above description has been made in an illustrative fashion, and not a restrictive one. Combination of the above embodiments, and other embodiments not specifically described herein will be apparent to those of ordinary skill in the art upon reviewing the above description.

The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. A fiber optic interconnection system, comprising;
a first optical network node that includes
a first distribution component that encodes a first information signal from the first optical network node onto a first optical signal and a second optical signal, wherein the first optical signal and the second optical signal have different wavelength ranges;
a first directional component for directing the first optical signal and the second optical signal having different wavelength ranges through one of a first or second interconnectivity components; and
a second optical network node that includes
a second distribution component that encodes a second information signal from the second optical network node onto a third optical signal and a fourth optical signal, wherein the third optical signal and the fourth optical signal have different wavelength ranges;
a second directional component for directing the third optical signal and the fourth optical signal having different wavelength ranges through one of the first or second interconnectivity component, where the first optical network node has a first receiver that receives the third optical signal and the fourth optical signal and combines the third optical signal and the fourth optical signal into a first combined information signal and the second optical network node has a second receiver that that receives the first optical signal and the second optical signal and combines the first optical signal and the second optical signal into a second combined information signal; and
an interconnectivity node that includes
the first interconnectivity component for receiving the first optical signal from the directional component of the first optical network node and sending the first optical signal to the second optical network node; and
a second interconnectivity component for receiving the second optical signal from the directional component of the first optical network node and sending the second optical signal to the second optical network node.

2. The interconnection system according to claim 1, where the distribution component includes a number of light sources for generating the different wavelength optical signals.

3. The interconnection system according to claim 1, where the system includes eight optical network nodes and four interconnectivity components, where each optical network node provides an information signal that is encoded on one of four light beams each at a different wavelength range totaling an optical signal, and where each optical signal is directed toward a different interconnectivity component.

4. An optical network node, comprising;
a distribution component that distributes a number of light beam segments where each segment includes a different wavelength range and where each segment is encoded with information from an information signal; and
a directional component for directing the number of optical signals having different wavelength ranges through one of a number of interconnectivity components, where each of the number of interconnectivity components is a passive fiber-optic star interconnection and a first of the number of interconnectivity components receives a first optical signal from the directional component of the optical network node and sends the first optical signal to a second optical network node and a second of the number of interconnectivity components receives a second optical signal from the directional component of the second optical network node and sends the second optical signal to the optical network node.

5. The optical network node according to claim 4, where the node includes a combination component that combines the optical signals that have been directed through the first and second interconnectivity components into a combined information signal.

6. The optical network node according to claim 4, where the optical network node includes multiple combination components that combine the optical signals that have been directed through the first and second interconnectivity components into a combined information signal.

7. The optical network node according to claim 4, where the optical network node includes multiple receiver components for receiving optical signals from multiple optical interconnect nodes and where each receiver component receives a number of specific optical signals in a number of particular wavelength ranges and directs the each specific optical signal to a combination component for combination with other specific optical signals directed from other receiver components.

8. A method, comprising:
distributing a number of light beam segments where each segment includes a different wavelength range and where each segment is encoded with information from an information signal to form a first optical signal and a second optical signal;
sending the first optical signal from a first optical network node to a second optical network node via a interconnecting node that includes a passive fiber-optic star interconnection;
receiving the first optical signal by a second optical network node;
sending the second optical signal from the second optical network node to the first optical network node via the interconnecting node that includes the passive fiber-optic star interconnection;
receiving the second optical signal by the first optical network node; and
combining the optical signals that have been directed through the interconnecting node that includes the passive fiber-optic star interconnection into a first combined information signal and a second combined information signal.

* * * * *